United States Patent
Renault et al.

[15] 3,658,477
[45] Apr. 25, 1972

[54] PROCESS FOR PURIFYING A GAS CONTAINING HYDROGEN SULFIDE WITH PRODUCTION OF SULFUR

[72] Inventors: Philippe Renault, Neuilly-sur-Seine; Henri Gruhier, Chatillon sur Bagneux, both of France

[73] Assignee: Institut Francais Du Petrole Des Carburants Et Lubrifiants, Rueil-Malmaisen, Hants de Seine, France

[22] Filed: Sept. 5, 1968

[21] Appl. No.: 757,736

[52] U.S. Cl. ........................................................23/225 K
[51] Int. Cl. .....................................................C01b 17/04
[58] Field of Search ..........................................23/225, 6, 3

[56] References Cited

UNITED STATES PATENTS

| | | | |
|---|---|---|---|
| 2,760,848 | 8/1956 | Dunning | 23/225 |
| 2,987,379 | 6/1961 | Urban | 23/225 |
| 3,441,379 | 4/1969 | Renault | 23/226 |
| 3,104,951 | 9/1963 | Urban | 23/225 |

*Primary Examiner*—Earl C. Thomas
*Assistant Examiner*—G. O. Peters
*Attorney*—Craig, Antonelli & Hill

[57] ABSTRACT

A process for purifying a gas containing hydrogen sulfide as the impurity, with the production of sulfur as a by-product which comprises contacting a gas containing hydrogen sulfide with a liquid phase containing at least one phosphoric acid ester and at least one alkanolamine, separating the purified gas free of hydrogen sulfide and treating the resulting solution containing hydrogen sulfide with a molecular oxygen-containing gas and separating sulfur therefrom.

8 Claims, 1 Drawing Figure

Patented April 25, 1972  3,658,477
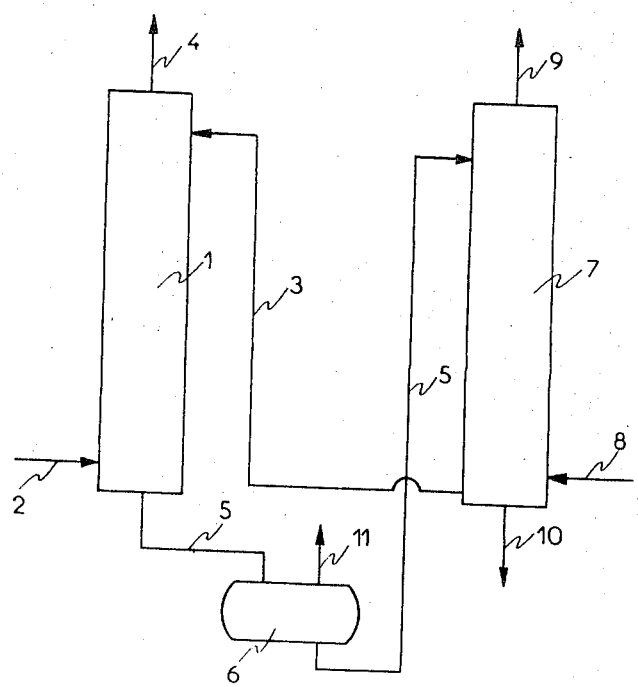
INVENTORS
Philippe Renault &
Henri Gruhier
BY Craig & Antonelli
ATTORNEYS

PROCESS FOR PURIFYING A GAS CONTAINING HYDROGEN SULFIDE WITH PRODUCTION OF SULFUR

The applicant has previously described in the French Pat. No. 1,492,797, filed Sept. 18, 1965, a process for converting hydrogen sulfide to sulfur by oxidation with air or oxygen, using solvents of $H_2S$ which are soluble in water, for example glycol ethers, containing small amounts of organic bases acting as catalyst. The conversion of $H_2S$ to sulfur takes place with the production of water. One part of this water is carried along by the air which is used as oxidizer. The other part accumulates in the solvent, which results into a dilution of the latter. The presence of substantial amounts of water in the solvent tends to improve the formation of by products, usually oxidized derivatives of sulfur, for example sulfates, thiosulfates, thus reducing the desired conversion to elemental sulfur. It is thus necessary to eliminate the formed water in order to obtain the desired conversion with the optimal yield.

It has now been discovered that other solvents than those described above could be used to convert $H_2S$ to sulfur by means of an oxygen-containing gas such as air, in the presence of alkanolamines, these solvents exhibiting the particular advantage of being substantially insoluble in water.

The solvents to be used according to this invention are the phosphoric esters of the general formula $PO(OR)_3$ in which the R radicals which may be identical or different, are selected amongst the monovalent hydrocarbon radicals, each containing at least three carbon atoms (for example three to 20) particularly the alkyl, cycloalkyl and aryl radicals, and the radicals of formula $-(R_1 - O)_n - R_2$ where $R_1$ is a hydrocarbon rest of two or three carbon atoms, $R_2$ is a hydrogen atom or hydrocarbon rest having preferably one to five carbon atoms, and n is an integer such as 1, 2 or 3.

By way of non-limitative examples, there will be mentioned the tributyl ester of orthophosphoric acid, the triisobutyl ester of orthophosphoric acid, the tricresyl esters of orthophosphoric acid, the tricyclohexyl ester of orthophosphoric acid, monocyclohexyl di-n.propyl orthophosphate and tri(butoxy -2 ethyl) phosphate.

The alkanolamines which may be used as catalysts are those proposed in the French Pat. No. 1492797, and more particularly those of formula

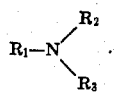

where at least one of the R groups is a group of formula $-C_pH_{2p}-OH$ where p is an integer from 2 to 6, the other groups being selected from the hydrogen atom, the alkyl groups of 1 to 18 carbon atoms and the $-C_rH_{2r}-OH$ group where r is an integer from 2 to 6. The $C_pH_{2p}$ and $C_rH_{2r}$ groups may contain an internal $-O-$ bond between two carbon atoms.

Alkanolamines which are highly soluble in the phosphoric esters will be, however, preferred, for example N-methyl diethanolamines. Other useful amines are diethanolamine, diisopropanolamine, monethanolamine, di-n. propanolamine, triethanolamine, N- butyl diethanolamine, N- methyl diisopropanolamine and aminoethoxyethanol.

The concentration of alkanolamine will be dependent of the amount of hydrogen sulfide to be converted and the operating conditions. It may vary, for example, from 0.1 to 50 percent by weight and will be most often of about 10 percent by weight with respect to the mixture of phosphoric ester with alkanolamine.

The mixture may further contain small amounts of water, however less than 10 percent by weight, according to the components of the mixture, an excess of water resulting into the formation of a second liquid phase which may be easily removed by decantation. The mixture may also contain a small amount of a mineral base. Finally diluents of known type, preferably insoluble in water, may be also used.

The joint drawing illustrates an embodiment of this invention.

In a first column 1, the treated gas is introduced through pipe 2 and hydrogen sulfide contained therein is absorbed into the mixture of phosphoric ester and amine which is introduced through pipe 3. The ester is by itself a good solvent for hydrogen sulfide; however the absorption is improved when the process is carried out under increased pressure. The used amine improves the purification of the gas, particularly when the partial pressure of hydrogen sulfide is—or tends to be — low.

The temperature will be chosen as low as possible, for example in the range of 20° to 50° C., since the absorption goes together with a heat release; however, the invention also covers the use of temperatures of 0° to 100° C. The pressure is usually chosen between 1 and 100 atmospheres.

The gas which is substantially free of $H_2S$ is removed through pipe 4 whereas the solution which issues at the basis of 1 through pipe 5 is usually subjected to a pressure release in 6 and then introduced into another column 7 where hydrogen sulfide is oxidized to sulfur by means of bubbling oxygen or air, said gas being introduced through pipe 8. This constitutes the regeneration step for the mixture of ester with amine.

The amount of injected air is usually in excess, for example 2 to 10 times and preferably 3 to 5 times that corresponding to the stoechiometrical amount for the conversion of $H_2S$ to sulfur. The excess of air is removed through pipe 9. The regeneration column is maintained at a temperature usually between 0° and 100° C., particularly between 20° and 100° C., and preferably between 50° and 60° C. The pressures may be selected in the same range as that given for the first step of the precess. The crystals of sulfur which form therein accumulate by gravity at the bottom of this column, as well as water resulting from the reaction. Sulfur is removed through pipe 10. It may be thereafter melted or washed.

The solution of amine in the phosphoric ester which has thus been regenerated by oxidation with air, may be reintroduced into column 1 through pipe 3.

Usually two phases appear at the basis of the regeneration column 7. A lower aqueous phase with sulfur and a higher organic phase consisting of the mixture of ester with amine, this mixture being recycled, as shown before, to the absorption column through pipe 3. This is particularly the case when in the regeneration column 7, the mixture of amine with phosphoric ester is introduced from the top through pipe 5 and this mixture flows down through the column.

However it is also possible to invert the connection points of pipes 3 and 5 in the case, for example, where the regeneration column should be full of liquid.

The mixture containing absorbed $H_2S$ should be then introduced at the lower part of column 7 whereas the same regenerated mixture should be recovered at the top of this column to be recycled to the absorption step.

If the impure gas also contains hydrocarbons, these may be recovered as a gaseous phase in pipe 11, following the pressure release in unit 6.

The absorption and oxidation steps may also be carried out in one column such as 1, when the dilution of the desulfurized gas by the unconverted oxidizing gas is not troublesome.

This process may particularly be applied to gases which contain from 0.5 to 100 percent by volume of hydrogen sulfide.

The following, non-limitative examples, illustrate this invention.

EXAMPLE 1

The treated gas consists of 2 percent by volume of $H_2S$, 6 percent by volume of carbon dioxide and 92 percent by volume of methane. This gas is introduced under a pressure of 40 kg./cm.² and at a rate of 1.000 liters per hour at the bottom of a packed tower at the top of which there is injected 2 liters per hour of liquid mixture of about 10 percent by weight of methyldiethanol-amine with 90 percent of triisobutylphosphate. The resulting gas contains only 500 parts per million of H₂S. The resulting liquid mixture, containing H₂S, is transferred at a rate of 2 liters per hour into the regeneration column maintained at 35° C. under the atmospheric pressure. At the bottom of this column, air is injected at a rate of 200 liters per hour. The yield of sulfur with respect to H₂S subjected to oxidation is 97 percent. This yield remained unchanged after 20 hours of run.

After 8 hours, an aqueous phase formed which was separated by mere decantation without any trouble for the operation.

EXAMPLE 2

This example is given by way of comparison and forms no part of this invention.

Example I is repeated, except that there is used the monoethyl ester of triethyleneglycol instead of triisobutylphosphate, in same amount by weight. The purification rate of the gas is substantially the same as in Example 1.

The amount of water in the solvent which is initially 0.5 percent by weight increases to 15 percent after 20 hours. During the same period the yield of sulfur falls from the initial value of 97 percent to the final value of 88 percent.

It is thus clear that the increase of the concentration of water in the solvent results into an increase of the secondary reactions. It is thus necessary to have a supplemental step for regenerating the solvent, said step consisting, for example, to eliminate water by distillation which increases the total cost of the operation.

EXAMPLE 3

This example illustrates an embodiment of the process, according to which the process is conducted in one column.

There is treated a gas (essentially air) comprising 2.5 percent (by volume) of H₂S, 4 percent of CO₂, 19 percent of O₂ and 74.5 percent of N₂. This gas is caused to bubble at a rate of 500 liters per hour into a solution at 1 percent by weight of N-methyl diethanolamine in tributylphosphate.

H₂S is practically completely converted (i.e., the gaseous effluent of the column contains substantially no H₂S) and the yield of sulfur is 97 percent with respect to H₂S introduced into the column.

EXAMPLE 4

Example 3 is repeated, except that methyldiethanolamine is replaced by the same weight of diethanolamine.

Substantially same results are obtained.

EXAMPLE 5

Example 3 is repeated, using as solvent a solution of 1 percent by weight diethanolamine in tri (butoxy -2 ethyl) phosphate.

The resulting gas contains 50 parts per million by volume of H₂S and the yield of sulfur is 95 percent with respect to oxidized H₂S.

What is claimed is:

1. A process for purifying a gas containing hydrogen sulfide as the impurity, with the production of sulfur as a by-product which comprises contacting a gas containing hydrogen sulfide with a liquid phase containing at least one phosphoric acid ester and at least one alkanolamine, separating the purified gas free of hydrogen sulfide and treating the resulting solution containing hydrogen sulfide with a molecular oxygen-containing gas and separating sulfur therefrom; said phosphoric acid ester-alkanolamine treatment and the oxidizing treatment being conducted at a temperature of from about 0° to 100° C.

2. A process according to claim 1, wherein the reaction is carried out in two steps wherein the first one consists of contacting the impure gas with the mixture of an alkanolamine and a phosphoric acid ester, and the second one consists of treating the resulting solution, separated from the purified gas, with the molecular oxygen-containing gas.

3. A process according to claim 1, wherein the alkanolamine is used in an amount of about 0.1 to 50 percent with respect to the weight of the mixture of the phosphoric acid ester and the alkanolamine.

4. A process according to claim 1, wherein the step of contacting the gas with phosphoric acid ester and the step of oxidizing the resulting solution are carried out simultaneously.

5. The process of claim 1, wherein the phosphoric acid ester is of the general formula PO(OR)₃ wherein R is selected from the group consisting of a monovalent hydrocarbon radical containing about three to 20 carbon atoms and a radical of the formula —(R₁—O)$_n$—R₂ where R₁ is a hydrocarbon radical containing two or three carbon atoms, R₂ is a hydrogen atom or a hydrocarbon radical containing one to five carbon atoms and n is an integer of 1, 2 or 3.

6. The process of claim 5, wherein the phosphoric acid ester is selected from the group consisting of the tributyl ester of orthophosphoric acid, the triisobutyl ester of orthophosphoric acid, the tricresyl ester of orthophosphoric acid, the tricyclohexyl ester of orthophosphoric acid, monocyclohexyl di-n propyl orthophosphate and tri (butoxy-2 ethyl) phosphate.

7. The process of claim 1, wherein the alkanolamine is of the general formula

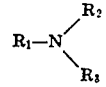

wherein at least one of the R groups is a group of the formula —C$_p$H$_{2p}$—OH where p is an integer from 2 to 6, and the other R groups are selected from the group consisting of a hydrogen atom, an alkyl group containing one to 18 carbon atoms, and —C$_r$ H$_{2r}$ — OH group where r is an integer from 2 to 6, the C$_p$H$_{2p}$ and C$_r$H$_{2r}$ groups also capable of containing an internal —O— bond between two carbon atoms.

8. The process of claim 7, wherein the alkanolamines are selected from the group consisting of N-methyl diethanolamine, diethanolamine, diisopropanolamine, monoethanolamine, di-n propanolamine, triethanolamine, N-butyl diethanolamine, N-methyl diisopropanolamine and aminoethoxyethanol.

* * * * *